May 29, 1923.

C. S. BAKER

SPARE TIRE CONTAINER

Filed Aug. 15, 1921

Witnesses:

Inventor
Coston S. Baker
By Joshua R. H. Potts
His Attorney

May 29, 1923.
C. S. BAKER
SPARE TIRE CONTAINER
Filed Aug. 15, 1921
1,456,962
2 Sheets-Sheet 2
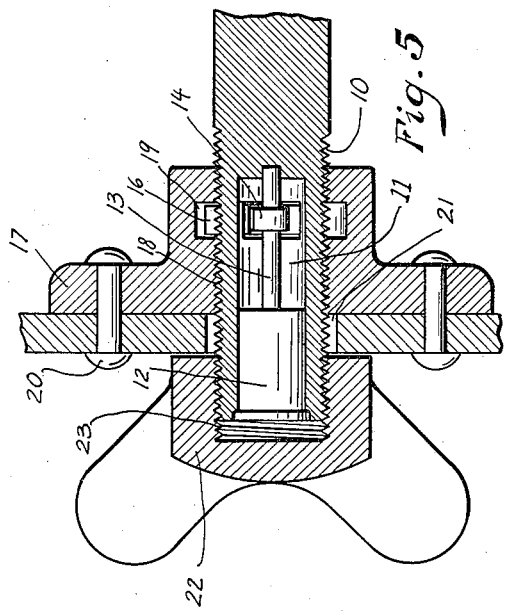
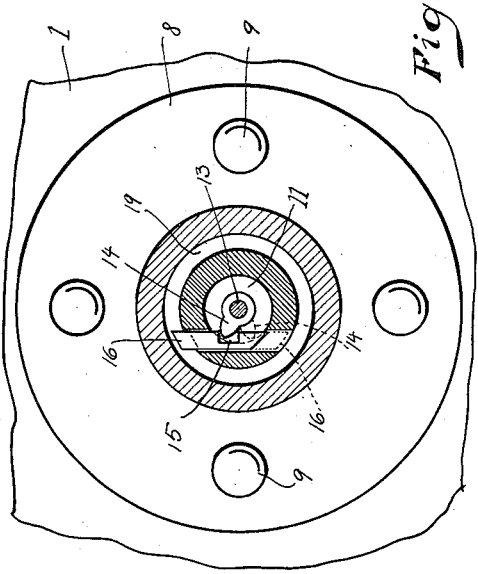
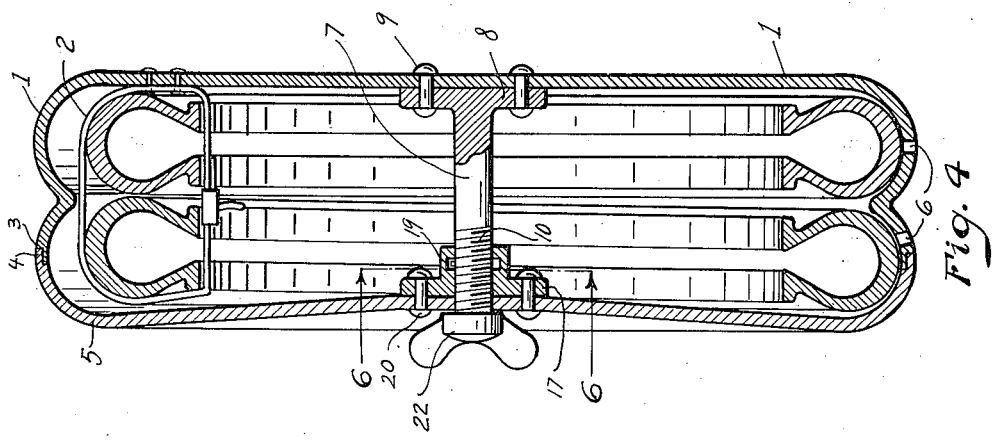
Witnesses:
Inventor
Coston S. Baker
By Joshua R H Potts
His Attorney Patented May 29, 1923.

1,456,962

UNITED STATES PATENT OFFICE.

COSTON S. BAKER, OF CHICAGO, ILLINOIS.

SPARE-TIRE CONTAINER.

Application filed August 15, 1921. Serial No. 492,389.

*To all whom it may concern:*

Be it known that I, COSTON S. BAKER, a citizen of the United States, and a resident of the city of Chicago, county of Cook and State of Illinois, have invented certain new and useful Improvements in Spare-Tire Containers, of which the following is a specification.

My invention relates to a spare tire container and has for its object the provision of a container which will be dust and waterproof, which will afford means for securely locking said container, and which will be neat and attractive in appearance and simple in construction.

Other objects will appear hereinafter.

The invention consists in the combinations and arrangements of parts hereinafter described and claimed.

The invention will be best understood by reference to the accompanying drawings forming a part of this specification, and in which, Fig. 1 is a view showing the container in position on an automobile.

Fig. 4 is a sectional view of the container taken on the line 4—4, Fig. 2.

Fig. 5 is a sectional detail view of the locking mechanism embodied in my invention, and Fig. 6 is a sectional detail view of the locking mechanism taken on the line 6—6, Fig. 4 looking in the direction of the arrows.

Figure 1:
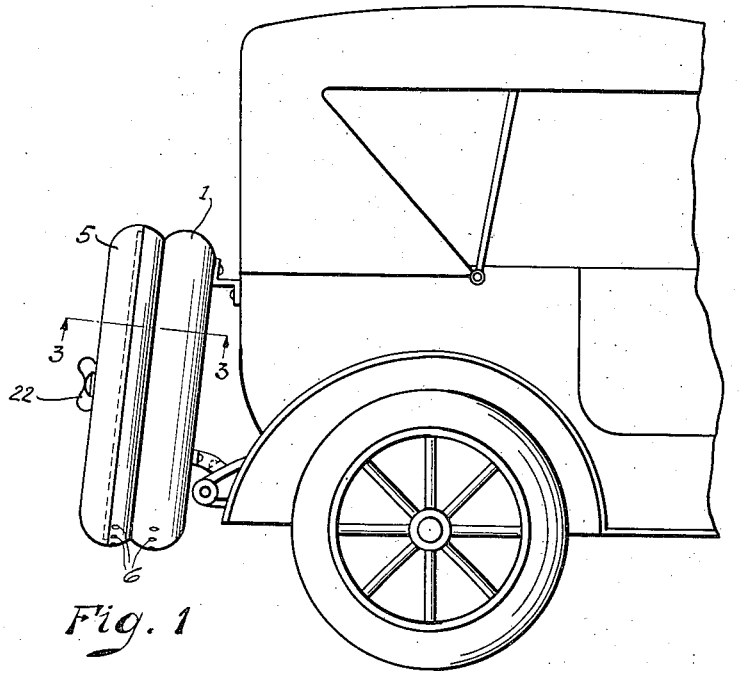
Figure 2:
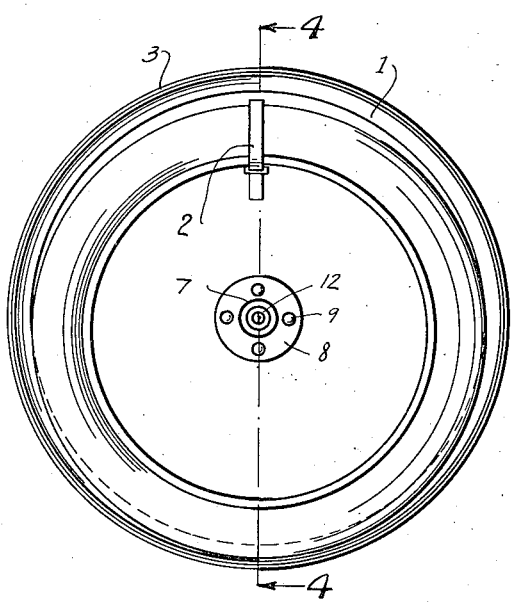
Fig. 2 is a plan view of the container with the covering removed therefrom.
Figure 3:
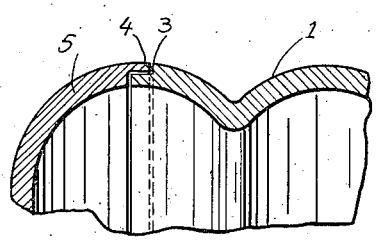
Fig. 3 is a sectional view of the container taken on the line 3—3, Fig. 1.

My invention broadly consists of a casing, a cover for said casing, and means for locking said cover to said casing to provide a water-tight and dust-proof container and to prevent theft of the tires carried therein.

The casing which I will designate 1 in the drawings may be secured to the rear of the automobile by any suitable fastening means. Such casing is preferably circular in shape and may be of any desirable size to accommodate one or more tires or wheels with tires, the casing shown in the drawing being constructed to accommodate two tires. Such casing also preferably broadly follows the outlines of the tires, thus providing a separate chamber therein for each tire. A strap 2 is riveted to the casing 1 as shown and provided with a suitable fastening means to hold the tires against movement in the casing. The edge of the casing is rabbeted as shown at 3 and is adapted to register with a similar opposite rabbet 4 in the covering 5 so as to provide a water-tight fit of the cover 5 on the casing 1. The casing 1 is also provided with drainage holes 6 which allow the escape of water which might work its way into the container.

Mounted centrally of the casing 1 is a post 7 having a flange 8 on its inner end which may be fastened to the casing 1 in any suitable manner, rivets 9 being shown.

The outer end of the post 7 is preferably exteriorly threaded as at 10, and in the end of such post is provided a recess 11. In the recess 11 I preferably mount the barrel of a lock 12 of any suitable kind, said lock being preferably provided with a pin 13, on which is mounted a tooth 14 which is adapted to engage a notch 15 in a bolt 16, which is slidably mounted in the wall of the chamber 11, and is adapted to be projected through an opening therein when the tooth 14 is operated by means of a key inserted in the lock 12.

The cover 5 is provided with a boss 17 on its inner side, such boss having an interiorly threaded bore 18, and also having an annular groove 19 therein, as shown in Figs. 5 and 6. The boss 17 is fastened to the cover 5 by means of rivets 20, or other suitable means, and the cover has an opening 21 corresponding to or slightly larger than the bore 18. A protective cap 22 is provided which has an interiorly threaded socket 23 adapted to engage the threads on the post 7 when the casing is assembled to prevent entry of foreign matter into the lock 12.

When the tires have been placed in the casing and secured against movement therein by fastening the strap 2, the threaded boss 17 on the cover 5 is screwed onto the outer end of the post 7 until the edges 4 of the cover 5 engage the edges 3 of the casing 1. The bolt 10 is then projected into the groove 19 by means of a key inserted in the lock 12, thereby securely locking the cover to the casing. The protective cap 20 is then applied to prevent foreign matter entering the lock 12.

The container is simple in construction and provides an efficient dust-proof and water-tight casing which may be securely locked to prevent the theft of tires placed therein, and which presents a neat and attractive appearance.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A protective tire casing having a post mounted therein; a cover mounted on said post; and locking means disposed within said post and adapted to engage said cover to prevent the removal thereof.

2. A protective tire casing having a post mounted therein; a cover engaging said post; and locking means mounted within said post and adapted in operative position to project beyond the periphery thereof to prevent the removal of said cover.

3. A protective tire casing having a post mounted therein, said post having its end exteriorly threaded; a cover threaded on said post; and locking means to prevent unthreading of said cover from said post.

4. A protective tire casing having a post mounted therein, said post having its end exteriorly threaded; a cover threaded on said post adapted to close said casing; and locking means mounted in said post and adapted to prevent unthreading of said cover therefrom.

5. A protective tire casing having a post mounted therein said post having its end exteriorly threaded; a cover threaded on said post and adapted to close said casing; and locking means mounted in said post and in operative position adapted to project beyond the outer periphery thereof to prevent unthreading of said cover from said post.

6. A protective tire casing having a post mounted therein, said post having its end exteriorly threaded; a cover having a member threadable on said post, there being an annular groove in said member; and locking means mounted in said post, said means in operative position projecting beyond the periphery of said post into said groove to prevent unthreading of said cover from said post.

7. Locking mechanism adapted to prevent relative movement of an inner member with respect to an outer member, there being a recess in said inner member having a lock mounted therein; and a bolt mounted in said inner member adapted to be projected by said lock beyond the periphery of said inner member and into contact with said outer member.

8. Locking mechanism adapted to prevent relative longitudinal movement of an outer member, threaded upon an inner member, said locking means comprising a lock mounted within said inner member; a pin mounted on said lock and having a tooth thereon; a bolt adapted to be projected beyond a periphery of said post operable by said tooth, there being a groove in said outer member for the reception of said bolt.

In testimony whereof I have signed my name to this specification in the presence of two subscribing witnesses.

COSTON S. BAKER.

Witnesses:
 CLARENCE E. THREEDY,
 JOSHUA R. H. POTTS.